(12) United States Patent
Ford et al.

(10) Patent No.: US 8,724,324 B2
(45) Date of Patent: May 13, 2014

(54) ROTATING RECTIFIER

(75) Inventors: Sepideh Ford, Luton (GB); Lyndon Paul Fountain, Buckingham (GB); Raymond Richard Bomford, Chalfont St. Peter (GB); Mark Wesley Bailey, Streetsboro, OH (US)

(73) Assignee: Goodrich Control Systems (GB)

( * ) Notice: Subject to any disclaimer, the term of this patent is extended or adjusted under 35 U.S.C. 154(b) by 178 days.

(21) Appl. No.: 13/361,087

(22) Filed: Jan. 30, 2012

(65) Prior Publication Data

US 2012/0195003 A1 Aug. 2, 2012

(51) Int. Cl.
*H05K 7/20* (2006.01)
*H01L 23/24* (2006.01)

(52) U.S. Cl.
USPC ........... 361/704; 361/699; 361/141; 257/714; 310/52; 310/54; 310/68 D

(58) Field of Classification Search
USPC .......... 361/699, 704; 310/52, 54, 68 D, 68 R; 363/141; 257/714
See application file for complete search history.

(56) References Cited

U.S. PATENT DOCUMENTS

| | | | |
|---|---|---|---|
| 3,739,209 A * | 6/1973 | Drabik | 310/64 |
| 4,303,935 A * | 12/1981 | Ragaly | 257/717 |
| 4,570,094 A | 2/1986 | Trommer | |
| 5,737,210 A | 4/1998 | Barahia | |
| 7,586,224 B2 * | 9/2009 | Osborn et al. | 310/68 D |
| 7,868,494 B2 * | 1/2011 | Grosskopf et al. | 310/68 D |
| 7,948,127 B2 * | 5/2011 | McDowall et al. | 310/68 D |
| 2008/0218035 A1 * | 9/2008 | Naghshineh | 310/68 D |
| 2010/0019628 A1 * | 1/2010 | Kitzmiller et al. | 310/68 D |
| 2010/0054005 A1 | 3/2010 | Grosskopf et al. | |
| 2010/0123360 A1 | 5/2010 | McDowall et al. | |

FOREIGN PATENT DOCUMENTS

| | | |
|---|---|---|
| GB | 1452157 | 10/1976 |
| WO | 2008005169 | 1/2008 |

OTHER PUBLICATIONS

GB Search Report dated May 20, 2011.

* cited by examiner

*Primary Examiner* — Robert J Hoffberg
(74) *Attorney, Agent, or Firm* — Andrus Intellectual Property Law, LLP

(57) ABSTRACT

A rectifier comprising an electrically conductive support 32, a first plurality of rectifier components 24 carried by the support 32 and having their anodes connected to a first bus bar 26, a second plurality of rectifier components 28 carried by the support 32 and having their cathodes connected to a second bus bar 30, the cathode of each of the first rectifier components 24 being connected to the anode of an associated one of the second rectifier components 28, and first and second resistance paths 40, 42 between the first and second bus bars 26, 30 and the support 32.

10 Claims, 3 Drawing Sheets

ROTATING RECTIFIER

This invention relates to a rotating rectifier, and in particular to a rotating rectifier suitable for use in a generator for use in aerospace applications, although it may also be used for other purposes.

The electrical generator of an aircraft typically comprises an exciter stage operable to generate an AC output which is rectified to form a DC input to the main electrical generator. It is common for the electrical generators used in aerospace applications to be of brushless form, including a rotor driven from a drive shaft connected to an output of an engine driven gearbox. The exciter stage includes stationary field windings arranged to be connected to a DC supply such as the output of a battery, a voltage regulator or the like. The exciter stage further includes windings mounted upon the rotor in which the AC output is induced upon rotation of the rotor. Commonly, the exciter windings are arranged such that the induced AC output is of three phase form.

The rectifier used to rectify the AC output from the exciter stage is arranged to rotate with the rotor, thereby avoiding the need to provide brushes or the like to conduct the output to a fixed rectifier. The rectifier includes a number of diodes which generate significant heat levels, in use. The rectifier therefore requires cooling, in use. In some arrangements the rectifier is air cooled, for example using a fan to draw air over the diodes, or a heat sink associated therewith, and thereby conduct heat away from the rectifier. Another approach is to bath the diodes in a recirculating coolant, for example a suitable cooling oil.

As mentioned above, the rectified, DC output from the rectifier is supplied to the windings of the main generator stage.

Rotating rectifiers of this general type are described in, for example, U.S. Pat. No. 4,570,094, US2010/0054005 and US2010/0123360.

It has been found that, after servicing, there is an increased risk of failure of the diodes of the rectifier. It is thought that this increase arises from the replacement of the cooling oil of fluid cooled rectifiers. Prior to replacement, the cooling oil will typically include a number of fine particles of electrically conductive material which will serve to provide a discharge path through the cooling oil, preventing the build up of significant static charge levels within the coolant. However, when replaced with clean cooling oil, the absence of such particles allows significant static charges to accumulate which may discharge into the rectifier and cause failure of some of the diodes thereof.

It is an object of the invention to provide a rectifier suitable for use in such applications and in which the disadvantages outlined hereinbefore are overcome or are of reduced effect.

According to the present invention there is provided a rectifier comprising an electrically conductive support, a first plurality of rectifier components carried by the support and having their anodes connected to a first bus bar, a second plurality of rectifier components carried by the support and having their cathodes connected to a second bus bar, the cathode of each of the first rectifier components being connected to the anode of an associated one of the second rectifier components, and first and second resistance paths between the first and second bus bars and the support.

It will be appreciated that, in the event of static discharges from the cooling oil to the components of the rectifier, the first and second resistance paths permit the conduction of such static discharges to the support. The support is conveniently grounded, thus the presence of the resistance paths reduces the risk of damage to the rectifier components in such circumstances.

The rectifier components preferably comprise diodes.

Conveniently, each bus bar is insulated from the support by a layer of an insulating material such as polyimide film such as KAPTON.

An electro-static discharge material washer may be provided between each rectifier component and the support, the electro-static discharge material washers forming parts of associated ones of the first and second resistance paths. The electro-static discharge material may be polyether ether ketone such as PEEK 480. The electro-static discharge material washers may result in the formation of a resistance of between 30KΩ and 100MΩ.

The resistance paths may alternatively each formed by the provision of an opening in the layer of insulating material in which a semi conductive material, for example silicone rubber, is provided to form a resistive path between the bus bar and the support. The semi conductive material conveniently extends into a recess formed in the support. Preferably, the manner in which the bus bars are connected to the support is such that the semi conductive material is clamped and compressed between the bus bars and the support.

The invention will further be described, by way of example, with reference to the accompanying drawings, in which.

Figure 1:
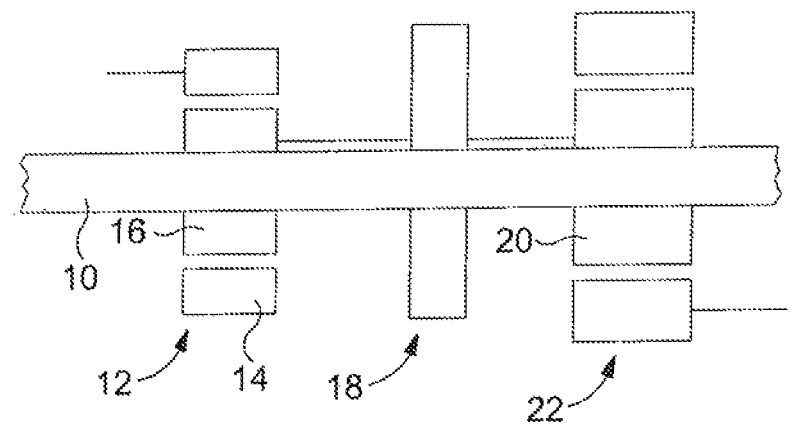
FIG. 1 is a diagram illustrating a generator incorporating a rectifier in accordance with an embodiment of the invention.

Referring firstly to FIG. 1 there is illustrated, diagrammatically, an electrical generator suitable for use in aerospace applications to provide an electrical supply for an aircraft. The generator comprises a rotor shaft 10 connected, in use, to a drive shaft driven for rotation from the gearbox associated with an engine of the aircraft. It will be appreciated that the rotor 10 is rotated, in use, at a speed related to the operating speed of the associated engine.

The generator includes an exciter stage 12 comprising stationary field windings 14 arranged to receive a DC supply and so develop a stationary magnetic field, in use. Mounted upon the rotor 10 and in alignment with the stationary windings 14 are a series of exciter windings 16, and it will be appreciated that rotation of the rotor 10, whilst the DC supply is connected to the field windings 14 results in an AC output being induced in each of the exciter windings 16. Conveniently, three separate exciter windings 16 are provided with the result that a three phase AC output is generated.

The generator further includes a rotating rectifier 18 mounted upon the rotor 10 and arranged to receive the three phase AC output of the exciter stage 12 and to rectify it to produce a DC output. The output from the rectifier 18 is supplied to the rotor mounted windings 20 of the main generator stage 22 of the generator.

Figure 2:
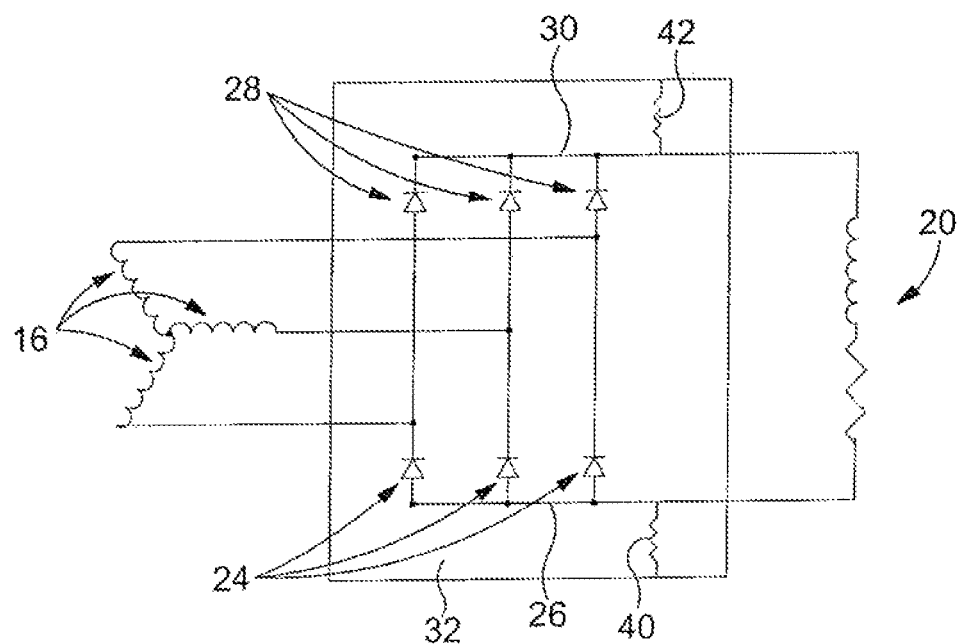
FIG. 2 is a diagram illustrating the embodiment of FIG. 1.

As illustrated diagrammatically in FIG. 2, the rectifier 18 comprises a first plurality of rectifier components in the form of diodes 24, the anodes of which are connected to a first bus bar 26 and the cathodes of which are connected to the anodes of respective ones of a second plurality of rectifier components in the form of diodes 28, the cathodes of which are connected to a second bus bar 30. As shown, three pairs of diodes 24, 28 are provided. One of the exciter windings 16 is associated with each pair of diodes 24, 28, being connected to a point between the cathode of the diode 24 and the anode of the diode 28 thereof. Connected to the bus bars 26, 30 are wires or conductors whereby the output from the rectifier 18 is supplied to the windings 20. Such a rectifier arrangement is of substantially conventional form and it will be understood that, in use, the AC output from the exciter windings 16 occurring on rotation of the rotor is rectified to form a DC input for the main generator windings 20.

Figure 3:
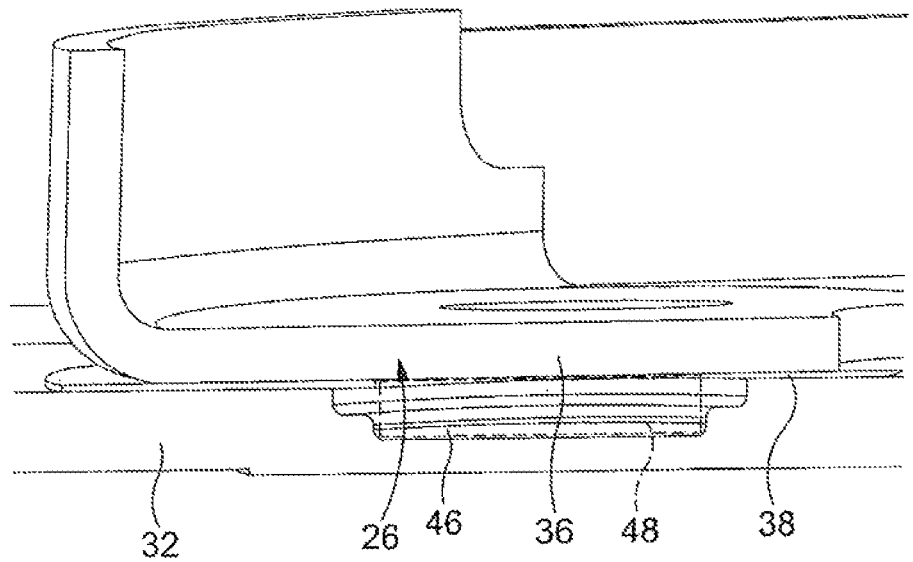
FIGS. 3 and 4 illustrate the construction of the embodiment of FIGS. 1 and 2 in greater detail.
Figure 4:
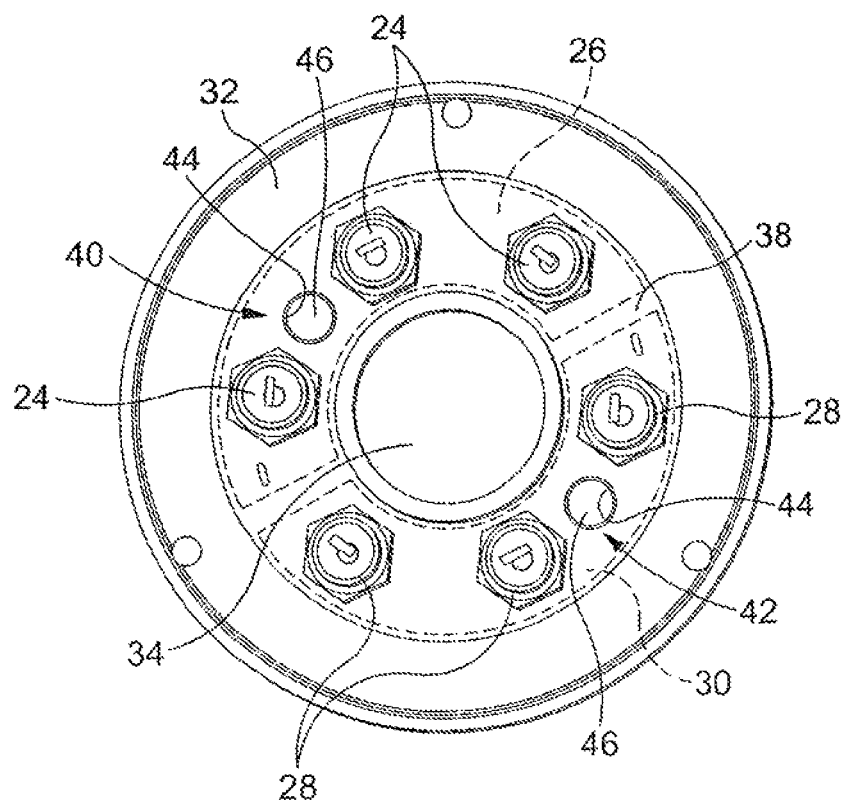

As illustrated diagrammatically in FIG. 2, each diode 24, 28 is mounted upon, although electrically insulated from, a support 32. FIGS. 3 and 4 show that the support 32 takes the form of a steel cup having a central opening 34 through which the rotor 10 extends, in use, such that the support 32 is secured and grounded to the rotor 10. The bus bars 26, 30, denoted by dashed lines in FIG. 4, each take the form of an arcuate copper plate 36 which extends adjacent part of the support 32 but is spaced therefrom by an annular disc 38 of an insulating material, for example in the form of polyimide film such as KAPTON, although other materials could be used. The first bus bar 26 is electrically connected to the anodes of the first diodes 24, and the second bus bar 30 is electrically connected to the cathodes of the second diodes 28. The diodes 24, 28 further include terminals whereby electrical connections (not shown in FIG. 4) between the diodes 24, 28 and the exciter windings 16 can be made.

In accordance with the invention, first and second resistance paths 40, 42 are provided between the first and second bus bars 26, 30 and the support 32. As shown in FIGS. 3 and 4, the first and second resistance paths 40, 42 are conveniently formed by providing the disc 38 with a pair of openings 44, one positioned beneath the first bus bar 26 and the other positioned beneath the second bus bar 30. Recesses 46 are formed in the support 32 in positions aligned with the openings 44. The recesses 46 and openings 44 together form a pair of pockets which receive respective semi-conductive elements 48, denoted by dashed lines in FIG. 3, which are clamped or compressed between the support 32 and the respective first and second bus bars 26, 30, providing the resistance paths 40, 42 therebetween. The semi-conductive material may be, for example, silicone rubber or the like.

Although not shown, the first and second bus bars 26, 30 are secured to the support 32 by the housings of the diodes 24, 28, the diodes 24, 28 taking the form of stud diodes or the like.

The diodes 24, 28 are bathed in a cooling oil or other suitable coolant fluid, in use. As outlined hereinbefore, there is a risk that, in use, static charges may accumulate within the coolant which may, under some conditions, discharge to the bus bars 26, 30 and/or diodes 24, 28, particularly when the cooling oil is clean and so contains few electrically conductive particles. It will be appreciated that by providing the resistance paths between the bus bars 26, 30 and the support 32, currents arising from such discharges may flow to the support 32 via the resistance paths 40, 42 and so be grounded, thereby reducing the risk of damage to the diodes 24, 28.

Figure 5:
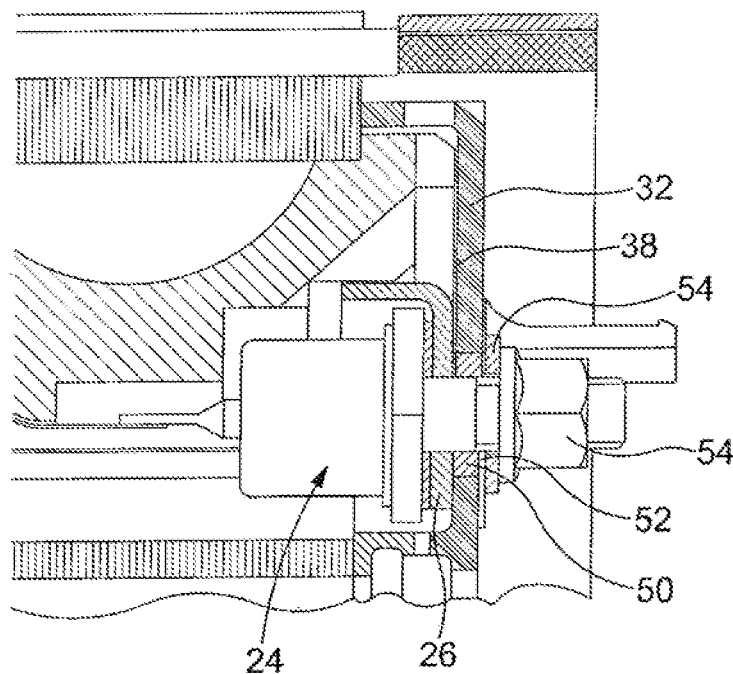
FIG. 5 is a diagram illustrating an alternative embodiment.

In the arrangement described hereinbefore, the resistance paths 40, 42 between the respective bus bars 26, 30 and the support 32 are defined by the openings 44 containing the semi-conductive elements 48. FIG. 5 illustrates an alternative construction. In this arrangement, the polyimide film such as KAPTON, or other suitable insulating material disc 38 is not provided with openings 44. Instead, each stud diode 24, 28 forms part of the respective resistance paths 40, 42. A washer or spacer 50 of an electro-static discharge (ESD) material, polyether ether ketone such as PEEK 480, is located around the part of each diode 24, 28 which extends through the support 32, and a washer 52 of the same or a similar material is located between a nut 54 (and associated steel washer 54) and a rear surface of the support 32.

In normal use, the ESD material spacer 50 and washer 52 provide a high resistance between, and hence serve effectively to electrically isolate or insulate the diodes 24, 28, and hence the bus bars 26, 30, from the support 32. The size of the resistance provided is between around 30KΩ and 100MΩ. To achieve this level of resistance, the thickness of the washer 52 is conveniently in the region of 1 mm. However, as with the arrangement described hereinbefore, discharge currents which could otherwise cause damage to the diodes and/or other components can flow to the support 32 via the resistance paths 40, 42, and so be grounded. The risk of damage is thus reduced.

Clearly, the presence of the resistance paths 40, 42 will result in parasitic losses. However, by appropriate design of the resistance paths 40, 42, the size of these losses can be acceptably low whilst still providing good protection against damage arising from static discharges.

Although some specific embodiments of the invention are described herein, it will be appreciated that a number of modifications and alterations may be made without departing from the scope of the invention. For example, other techniques may be used to provide the resistance paths between the bus bars and the support, such as directly mounting two surface mount resistors to the support at the periphery of the insulation disc 38 and providing connections from each bus bar to a respective one of the resistors. However, the arrangements described hereinbefore, especially that of FIG. 5, are thought to be particularly convenient.

The invention claimed is:

1. A rectifier comprising:
an electrically conductive support,
a first plurality of rectifier components carried by the support and having their anodes connected to a first bus bar,
a second plurality of rectifier components carried by the support and having their cathodes connected to a second bus bar, the cathode of each of the first plurality of rectifier components being connected to the anode of an associated one of the second plurality of rectifier components,
a first resistance path between the first bus bar and the support, and
a second resistance path between the second bus bar and the support,
wherein each of the first and second bus bars is insulated from the support by a layer of an insulating material, and
wherein the first and second resistance paths are each formed by the provision of an opening in the layer of the insulating material in which a semi conductive material is provided to form the resistive path between a respective one of the first and second bus bars and the support.

2. The rectifier according to claim 1, wherein the first and second plurality of rectifier components are cooled using a liquid coolant.

3. The rectifier according to claim 1, wherein the first and second plurality of rectifier components comprise diodes.

4. The rectifier according to claim 1, wherein the insulating material is a polyimide film.

5. The rectifier according to claim 1, wherein an electrostatic discharge material washer is provided between each rectifier component of the first and second plurality of rectifier components and the support, the electro-static discharge material washers forming parts of associated ones of the first and second resistance paths.

6. The rectifier according to claim 5, wherein the electrostatic discharge material is polyether ether ketone (PEEK).

7. The rectifier according to claim 5, wherein the electrostatic discharge material washers result in the formation of a resistance of between 30KΩ and 100MΩ.

8. The rectifier according to claim 1, wherein the semi conductive material is a silicone rubber material.

9. The rectifier according to claim 1, wherein the semi conductive material extends into a recess formed in the support.

10. The rectifier according to claim 1, wherein the manner in which each of the first and second bus bars are connected to the support is such that the semi conductive material is clamped and compressed between the each of the first and second bus bars and the support.

* * * * *

UNITED STATES PATENT AND TRADEMARK OFFICE
CERTIFICATE OF CORRECTION

PATENT NO. : 8,724,324 B2  
APPLICATION NO. : 13/361087  
DATED : May 13, 2014  
INVENTOR(S) : Sepideh Ford et al.

Page 1 of 1

It is certified that error appears in the above-identified patent and that said Letters Patent is hereby corrected as shown below:

Title page, item (73) of the patent should read as follows:

(73) Assignee: Safran Power UK Ltd. (GB)

Signed and Sealed this  
Fourth Day of August, 2015

Michelle K. Lee  
*Director of the United States Patent and Trademark Office*